United States Patent [19]

Fletcher

[11] 4,053,576
[45] Oct. 11, 1977

[54] SYSTEM FOR OBTAINING HYDROGEN AND OXYGEN FROM WATER USING SOLAR ENERGY

[75] Inventor: Edward A. Fletcher, Minneapolis, Minn.

[73] Assignee: The Regents of the University of Minnesota, Minneapolis, Minn.

[21] Appl. No.: 578,404

[22] Filed: May 19, 1975

[51] Int. Cl.² .............................................. C01B 13/00
[52] U.S. Cl. .................... 423/579; 23/252 R; 23/260; 423/648 R
[58] Field of Search ................. 203/DIG. 1; 202/234; 159/1.5; 23/252 R, 260; 423/648, 579

[56] References Cited

U.S. PATENT DOCUMENTS

| | | | |
|---|---|---|---|
| 2,760,920 | 8/1956 | Olsen | 202/234 |
| 2,803,591 | 8/1957 | Coanda et al. | 202/234 |
| 3,080,442 | 3/1963 | Hobert | 429/17 |
| 3,300,393 | 1/1967 | Fisher | 159/1.5 |
| 3,901,669 | 8/1975 | Seitzer | 423/648 R |

FOREIGN PATENT DOCUMENTS

| | | | |
|---|---|---|---|
| 45-14404 | 6/1970 | Japan | 423/648 |
| 45-2642 | 9/1970 | Japan | 423/648 |

OTHER PUBLICATIONS

Duffie et al., "Solar Heat Exchangers," Chemical Engineering Progress (vol. 56, No. 7), July 1960, pp. 63–67.

Primary Examiner—O. R. Vertiz
Assistant Examiner—Wayne A. Langel
Attorney, Agent, or Firm—Burd, Braddock & Bartz

[57] ABSTRACT

A system for producing and separating hydrogen and oxygen from water in which water is pumped through a preferentially permeable walled vessel heated to a high temperature by a solar energy concentrator. The water dissociates at high temperatures. Lower molecular weight components, especially hydrogen, diffuse preferentially through the vessel walls and are drawn off and separated. Oxygen may be separated from the products which do not diffuse through the walls by conventional separation techniques. A system is provided for making use of solar energy to produce storable fuels for use during periods of no sunshine.

14 Claims, 2 Drawing Figures

SYSTEM FOR OBTAINING HYDROGEN AND OXYGEN FROM WATER USING SOLAR ENERGY

This invention is directed to a system for making use of solar energy to produce storable fuels by producing and separating hydrogen and oxygen from water.

BACKGROUND OF THE INVENTION

Interest in utilization of solar energy has intensified due to continuing high energy demands and gradual depletion of the earth's fossil fuels. An important inadequacy of solar energy as a prime energy source is the fact that it is not available when the sun is not shining. It has been proposed that solar power be used in a number of different ways to make energy available for heat or work at night and on cloudy days when the sun is not shining. Among these are included such expedients as heating water, rocks, or other substances to increase their thermal-energy content by means of temperature increases, phase changes, or chemical reactions which can be easily reversed. However, such means require very massive or voluminous reservoirs, and have relatively limited energy storage lifetimes. Other means have been proposed such as using the solar energy, when it is available, to produce electric power to pump water to higher elevations from which it may be utilized to produce hydroelectric power when needed, or to electrolyze water to produce hydrogen and oxygen which can be stored indefinitely and used later in a variety of power plants and energy converting devices.

Hydrogen is an energetic fuel, and oxygen has great commercial value. It has long been known that at high temperatures water can be thermally decomposed into a mixture which contains substantial amounts of atomic or elemental hydrogen and oxygen and molecular hydrogen and oxygen. However, the components of the dissociated mixture recombine into water when the mixture is cooled. Production by thermal means alone of hydrogen and oxygen from water has, therefore, been thought to be impractical. Separation by electrolysis is readily achieved but involves undesirable intermediate energy conversions.

SUMMARY OF THE INVENTION

High temperatures necessary for thermal dissociation of water are now achievable in solar energy concentrating devices. This invention is directed to a system utilizing solar energy for heating and making use of molecular and/or thermal diffusion to separate a mixture of water dissociation products into hydrogen and oxygen.

More specifically, this invention is directed to a system for the production of hydrogen and oxygen from water by high temperature dissociation through utilization of solar energy and separation, by a preferential diffusion process, of the mixture into two fractions, from one of which hydrogen can easily be recovered, and from the other of which oxygen can easily be recovered. According to the invention, water is pumped into a preferentially permeable walled vessel which is heated to a high temperature therein by means of a solar energy concentrator. The hydrogen which diffuses preferentially through the vessel walls, either in the form of substantially pure hydrogen or in admixture with other dissociation components, is drawn off and stored for later use. The fraction which does not diffuse through the vessel walls is cooled. Oxygen is then easily separated from it.

DESCRIPTION OF THE DRAWINGS

The invention is illustrated in the accompanying drawings in which.

DESCRIPTION OF THE PREFERRED EMBODIMENT

Solar energy concentrators, such as parabolic reflectors and the like, are capable of producing high temperatures in the range of 1500°–3000° Kelvin. At these temperatures, water is substantially dissociated into a mixture which includes steam, molecular hydrogen, molecular oxygen, atomic hydrogen, atomic oxygen, and hydroxyl as the major components. The equilibrium composition of such a mixture can be calculated with reasonable accuracy by well known thermodynamic methods. The results of such a computation are shown in Table I which omits minor components which are present only in small amounts. It is seen from this Table that water is decomposed to a greater and greater extent at higher temperatures into atomic and molecular hydrogen and oxygen. As shown in Table II, which gives the results of a similar calculation at 3000° K and various pressures, the equilibrium composition is also affected by pressure, water being decomposed to a greater extent at lower pressures into atomic and molecular hydrogen and oxygen.

Figure 1:
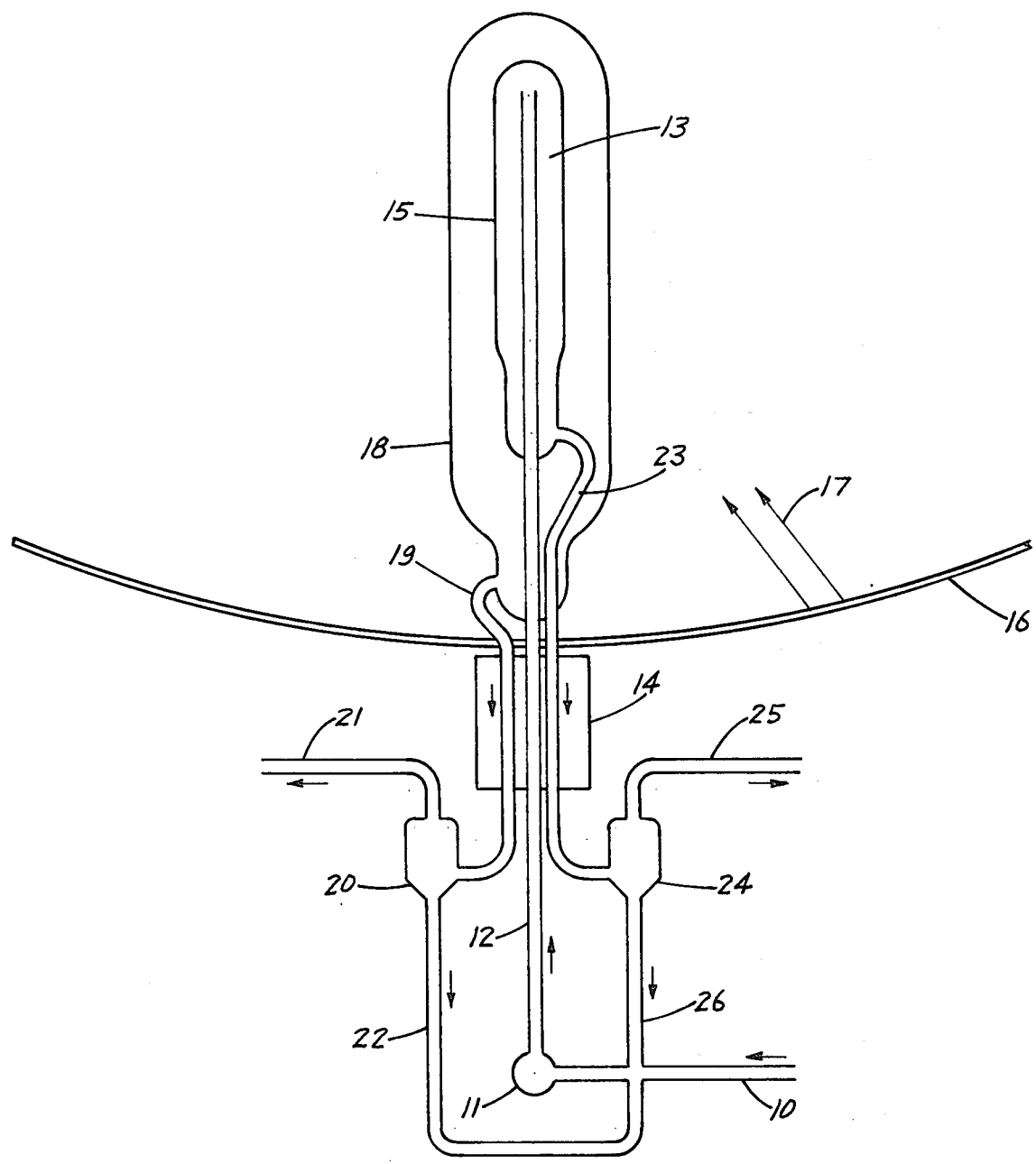
FIG. 1 is a schematic representation of one form of system for production and separation of hydrogen and oxygen from water by use of solar energy.

Referring now to the drawings, and particularly to FIG. 1, there is shown a schematic representation of one form of system embodying the present invention. Liquid water from a supply line 10 is forced by pump 11 through a feed line 12 to a dissociation or decomposition chamber 13. Feed line 12 passes through a heat exchanger 14 in which the liquid water is heated and some or all of it may be vaporized. Heat for this process is derived from the separated dissociated products as hereinafter described. The dissociation chamber 13 is enclosed by an opaque heat absorptive porous barrier 15 forming a diffusion membrane or envelope.

TABLE I

Volume Fractions of Principle Components of Equilibrium Mixture Obtained from Water Substance at One Atmosphere Pressure

| | Temperature ° K | | | |
|---|---|---|---|---|
| Component | 1000 | 2000 | 3000 | 4000 |
| H | $5.5 \times 10^{-13}$ | $1.2 \times 10^{-4}$ | 0.058 | 0.503 |
| $H_2$ | $6.1 \times 10^{-8}$ | 0.0058 | 0.135 | 0.101 |
| O | $2.2 \times 10^{-13}$ | $3.3 \times 10^{-5}$ | 0.0243 | 0.251 |
| OH | $1.9 \times 10^{-8}$ | 0.0021 | 0.091 | 0.088 |
| $H_2O$ | $\approx 1.0$ | 0.9896 | 0.644 | 0.0294 |
| $O_2$ | $2.0 \times 10^{-6}$ | 0.0024 | 0.047 | 0.0287 |

TABLE II

Volume Fractions of Principle Components of Equilibrium Mixture Obtained from Water Substance of 3000° K at Various Pressures

| | P, atm | | | |
|---|---|---|---|---|
| Component | 1/10 | 1 | 10 | 50 |
| H | 0.211 | 0.058 | 0.014 | 0.005 |
| $H_2$ | 0.181 | 0.135 | 0.075 | 0.046 |
| O | 0.091 | 0.024 | 0.006 | 0.002 |
| OH | 0.126 | 0.091 | 0.05 | 0.031 |
| $O_2$ | 0.066 | 0.047 | 0.025 | 0.016 |
| $H_2O$ | 0.324 | 0.644 | 0.830 | 0.900 |

The diffusion membrane is formed of heat absorptive refractory material capable of withstanding high temperature (e.g., about 1500°–3000° K) and permitting the preferential passage of atomic and molecular hydrogen. Depending upon the material of which the membrane is formed, other dissociation products may be diffused in lesser amounts than hydrogen while bulk flow of water is prevented. The diffusion membrane may be formed, for example, from platinum group metals, and especially refractory oxides, such as ceric or other rare earth oxides, hafnium oxide ($HFO_2$), uranium oxide ($UO_2$), strontium oxide (SrO), zirconia, alumina, thoria, lime (calcium oxide), beryllium oxide, or refractory nitrides, depending on the temperatures and pressures at which the process is operated.

It is known, for example, that the platinum group metals constitute a family of materials which, even in their massive state with no porosity, can be used to separate hydrogen from other gases because hydrogen diffuses through them. However, the high cost and temperature range over which the metals can be used limit the use of these materials in favor of more porous and/or less costly and/or more refractory materials.

Where a porous material is used, the holes in the diffusion membrane should be small enough to effect separation rather than permit bulk flow of the mixture. The most effective separation is achieved when the diameter of the holes is about the order of the mean free path of the gas molecules. Individual molecules can then pass the barrier but the bulk flow of gas is effectively prevented. Since at a given temperature lighter molecules move with greater velocity than heavy molecules, the light molecules will strike the walls more frequently, relative to their concentration, and thus they tend to pass through the walls preferentially. (For general discussion of gaseous diffusion, see Chemical Engineers's Handbook, Perry and Chilton, Fifth Edition, 1973, pages 17–45 and 17–46, incorporated herein by reference.)

The diffusion membrane is located at the focus or target zone of a parabolic mirror 16 or other means for concentrating the sun's rays 17 at a focus point. The diffusion membrane is contained within a non-permeable outer casing 18 which is transparent to solar radiation and not at focus relative to the solar concentrator. The walls of casing 18 are spaced from the diffusion membrane to form a collection chamber for the preferentially diffused dissociation products. This chamber may be heated or cooled as necessary.

If the casing is in close proximity to the diffusion membrane, it must be made of a material capable of withstanding high temperatures. Farther away it may be made of glass or synthetic resinous material transparent to solar radiation. For example, the casing material may enclose the diffusion membrane by extending from the edges of a parabolic mirror in which the diffusion cell is positioned, in which case the bowl defined by the mirror becomes part of the collection chamber which can easily be kept cool and the casing need not be resistant to high temperatures.

Hydrogen product line 19 extends from the casing 18 through heat exchanger 14 to a gas-liquid separator 20 to separate gaseous hydrogen from water formed upon cooling of the hydrogen-enriched dissociation products. Gaseous hydrogen is passed from the separator through line 21 to suitable storage means, i.e., compressors, storage tanks, etc. The separated water may be recycled through line 22 for reintroduction to the dissociation chamber.

An oxygen product line 23 extends from the dissociation chamber 13 through condenser 14 to a gas-liquid separator 24 where gaseous oxygen is separated from the residual oxygen enriched dissociation mixture. The oxygen is passed through line 25 to oxygen storage facilities and the separated water may be passed through line 26 for recycling.

In the operation of the system, the feed water after partial or total vaporization in the condenser 14 passes to the dissociation chamber 13 where it is heated to a high temperature (between about 1500°–3000° K) as a consequence of having the sun's rays brought to a focus on the dissociation cell. The water dissociates under these high temperature conditions and the dissociation products are separated into two fractions by preferential diffusion of the lighter molecules through the diffusion membrane. In the case of a porous membrane, all of the dissociation products pass through the diffusion membrane but hydrogen predominates. Upon subsequent cooling, the dissociation products recombine to form liquid water and gaseous hydrogen which are readily separated by well known means.

Those dissociation products which have not passed through the porous diffusion membrane will have been enriched in oxygen and upon subsequent cooling recombined to form liquid water and gaseous oxygen, which are readily separable. The molecular hydrogen and oxygen gaseous products are then available for storage for use during periods of little or no sunshine and for shipment to areas of inadequate sunshine to meet current energy needs. For example, hydrogen may be used directly as a fuel, or to enrich other fuels, or in the manufacture of liquid fuels, or the hydrogen and oxygen thus produced may be used in a fuel cell to produce electric power as needed, or the products may be used for any other purpose for which hydrogen and/or oxygen can be used.

EXAMPLE

The invention is further illustrated by the following example. If, under ideal conditions, about 10 moles (180 grams) of water are put through the system (at 3000° K and one atmosphere pressure) and about one-tenth of the water (18 g.) goes through the diffuser wall, and both fractions are collected and cooled, on the hydrogen side about 0.95 moles (17 g.) of water and about 0.44 moles (0.881 g.) of hydrogen will have been collected. On the oxygen side about 8.61 moles (155 g.) of water and about 0.22 moles (7.02 g.) of oxygen will have been collected. The work required for pumping the water is about 18.2 joules. However, the heating value of the hydrogen produced is about 106,200 joules.

Figure 2:
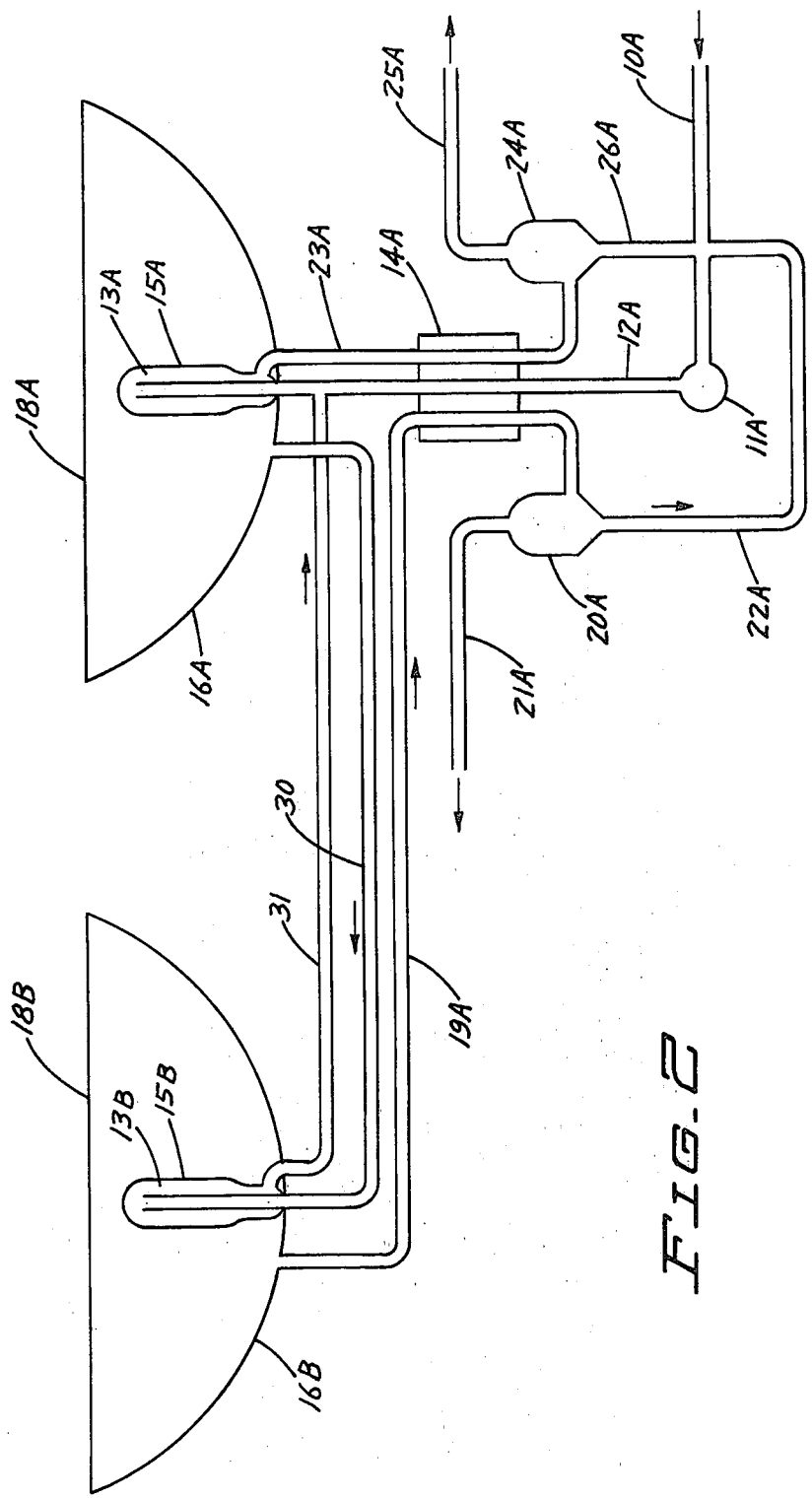
FIG. 2 is a schematic representation of another form of system for the same purpose.

Referring now to FIG. 2, there is shown schematically another form of system in which the feed water is cascaded to produce varying degrees of separation. A plurality of diffusion cells 15A and 15B are disposed in series so that the hydrogen-enriched dissociation products from the first cell 15A are passed directly through a line 30 to a second cell 15B, and so on, without cooling for further hydrogen enrichment. After passage through the last diffusion cell, the hydrogen-enriched products are passed through line 19A, through heat exchanger 14A to separator 20A and the hydrogen separated and passed off through line 21A. The separated water may be recycled through line 22A for reintroduction to the first dissociation chamber.

The oxygen-enriched dissociation products from the second dissociation chamber 13B pass through line 31 for admixture with the reactants going to dissociation chamber 13A. The products from chamber 13A are cooled in heat exchanger 14A after which gaseous oxygen is separated in gas-liquid separator 24A and passed through line 25A for storage. The separated water may be recycled for reintroduction to the first dissociation chamber.

In this form of system, as illustrated, the diffusion cells are disposed at the focus of dish-shaped parabolic mirrors 16A and 16B. Outer casings 18A and 18B are glass or other sheet material transparent to solar radiation enclosing the open tops of the mirrors and the diffusion cells forming a collection chamber for hydrogen-enriched dissociation products. The optical quality of the casings must be good enough to permit good focusing of the sun's image on the dissociation chamber.

The invention is not limited to a system of any particular geometry. The systems shown and described are for illustrative purposes only. Multiple mirrors may be used and the dissociation chamber may be constructed in the form of long pipes, for example. Detailed valving, while not shown, is somewhat arbitrary and being specified according to well known engineering principles can readily be planned by any engineer competent in the field.

Although the yield of recoverable gases increases markedly with increased temperature, because the reactions leading to equilibrium are very fast, with continous removal of hydrogen rather complete separation can be achieved in a reasonably small device at lower temperatures. For example, at 2000° K, it is easier to find suitable materials for use for the diffusion vessel and heat losses are considerbly smaller. However, operation at a higher temperature is desirable since at 3000° K, the yields are much greater, water at that temperature being dissociated to the extent that the volume fraction of molecular hydrogen is almost 14 percent and that of atomic hydrogen is 6 percent. Continuous separation of this hydrogen through the wall of the dissociation chamber then causes the equilibrium composition to be continuously shifted in the direction of more water decomposition permitting continuous operation so long as adequate sunshine is available.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. Apparatus for obtaining hydrogen and oxygen from water utilizing solar energy, said apparatus comprising:
   A. a water-dissociation chamber having a wall preferentially permeable to the passage of lower molecular weight dissociation components including hydrogen,
   B. means connected to the dissociation chamber for supplying water to said chamber,
   C. solar energy concentrating means focused on said dissociation chamber for heating said chamber to a temperature at which water is dissociated into steam, molecular hydrogen, molecular oxygen, atomic hydrogen, atomic oxygen and hydroxyl,
   D. means connected to the dissociation chamber for withdrawing oxygen enriched dissociation products from said chamber,
   E. a non-permeable casing saced from and enclosing said dissociation chamber wall and forming a hydrogen enriched dissociation product collection chamber,
   F. means connected to said collection chamber for withdrawing hydrogen enriched dissociation product from said chamber,
   G. cooling means for cooling said oxygen enriched dissociation products and partially liquefying the same, and
   H. gas-liquid separation means for separating gaseous oxygen from the cooled oxygen enriched dissociation products.

2. Apparatus according to claim 1 further characterized in that said dissociation chamber wall is opaque and radiation absorptive.

3. Apparatus according to claim 2 further characterized in that said dissociation chamber wall consists essentially of a platinum group metal.

4. Apparatus according to claim 1 further characterized in that:
   A. said dissociation chamber wall is porous, whereby hydrogen-enriched dissociation products are preferentially diffused through said wall,
   B. cooling means are provided for cooling said hydrogen enriched dissociation products and partially liquefying the same, and
   C. separate gas-liquid separation means are provided for separating gaseous hydrogen from the cooled hydrogen-enriched dissociation products.

5. Apparatus according to claim 4 further characterized in that said dissociation chamber wall consists essentially of a refractory metal oxide.

6. Apparatus according to claim 1 further characterized in that:
   A. said cooling means is a heat exchanger,
   B. said water supply means passes through said heat exchanger, and
   C. said dissociation product withdrawing means pass through said heat exchanger in heat exchanging relation to said supply means.

7. Apparatus according to claim 1 further characterized in that said solar energy concentrating means is a concave reflector.

8. Apparatus according to claim 1 further characterized in that said non-permeable casing is transparent to solar radiation.

9. A method for obtaining hydrogen and oxygen from water utilizing solar energy, said method comprising:
   A. supplying water to a dissociation zone, having a wall preferentially permeable to the passage of lower molecular weight dissociation components, including hydrogen
   B. causing said water within said zone to dissociate into steam, molecular hydrogen, molecular oxygen, atomic hydrogen, atomic oxygen and hydroxyl by heating by means of concentrated solar energy to a temperature at which water is dissociated,
   C. separating hydrogen enriched dissociation product from said dissociation zone by preferential diffusion through said wall, and collecting said hydrogen enriched product,
   D. withdrawing said hydrogen enriched dissociation product, E. withdrawing oxygen enriched dissociation products remaining in said dissociation zone and cooling to liquefy a portion of the same, and F. separating gaseous oxygen from the resulting mixture.

10. A method according to claim 9 further characterized in that said water is at least partially vaporized prior to introduction to said dissociation zone.

11. A method according to claim 10 further characterized in that said water is at least partially vaporized and said dissociation products are cooled by passage of the water and said dissociation products in heat exchanging relation.

12. A method according to claim 9 further characterized in that:

A. the hydrogen enriched dissociation products are cooled to reliquefy a portion of the same, and B. gaseous hydrogen is separated from the resulting mixture.

13. A method according to claim 12 further characterized in that the liquefied dissociation mixture from which hydrogen and oxygen have been separated is recyled to said dissociation zone.

14. A method according to claim 9 further characterized in that said water is heated to a dissociation temperature between about 1500° to 3000° K.

* * * * *

UNITED STATES PATENT AND TRADEMARK OFFICE
CERTIFICATE OF CORRECTION

PATENT NO. : 4,053,576
DATED : October 11, 1977
INVENTOR(S) : Edward A. Fletcher It is certified that error appears in the above—identified patent and that said Letters Patent are hereby corrected as shown below:

Column 3, line 11, "($HFO_2$)" should be --($HfO_2$).

Column 6, Claim 1, subparagraph E, line 1, "saced" should be --spaced--.

*Signed and Sealed this*

*Twenty-fourth* Day of *January 1978*

[SEAL]

Attest:

RUTH C. MASON
*Attesting Officer*

LUTRELLE F. PARKER
*Acting Commissioner of Patents and Trademarks*